United States Patent [19]

Swoboda et al.

[11] Patent Number: 5,884,023
[45] Date of Patent: Mar. 16, 1999

[54] METHOD FOR TESTING AN INTEGRATED CIRCUIT WITH USER DEFINABLE TRACE FUNCTION

[75] Inventors: Gary L. Swoboda, Sugarland; Eric J. Stotzer, Houston, both of Tex.

[73] Assignee: Texas Instruments Incorporated, Dallas, Tex.

[21] Appl. No.: 762,487

[22] Filed: Dec. 9, 1996

Related U.S. Application Data

[60] Provisional application No. 60/008,617 Dec. 14, 1995.
[51] Int. Cl.$^6$ ...................................................... G06F 11/00
[52] U.S. Cl. .......................................................... 395/183.06
[58] Field of Search ........................ 395/183.06, 183.01, 395/183.14, 183.15; 364/551.01, 221.7, 264.1, 264.7, 267, 267.8

[56] References Cited

U.S. PATENT DOCUMENTS

| | | | |
|---|---|---|---|
| 4,701,921 | 10/1987 | Powell et al. | 371/25 |
| 4,860,290 | 8/1989 | Daniels et al. | 371/25 |
| 4,872,169 | 10/1989 | Whetsel, Jr. | 371/22.3 |
| 4,912,636 | 3/1990 | Magar et al. | 364/200 |
| 5,072,418 | 12/1991 | Boutaud et al. | 364/715.06 |
| 5,084,874 | 1/1992 | Whetsel, Jr. | 371/22.3 |
| 5,263,143 | 11/1993 | Robinson et al. | 395/425 |
| 5,329,471 | 7/1994 | Swoboda et al. | 364/578 |
| 5,425,036 | 6/1995 | Liu et al. | 371/23 |
| 5,535,331 | 7/1996 | Swoboda et al. | 395/183.21 |
| 5,566,300 | 10/1996 | Naoe | 395/183.06 |
| 5,621,651 | 4/1997 | Swoboda | 364/489 |
| 5,809,293 | 9/1998 | Bridges et al. | 395/568 |

FOREIGN PATENT DOCUMENTS

| | | | |
|---|---|---|---|
| 61-233651 | 9/1986 | Japan | G06F 11/28 |
| 4-345906 | 12/1992 | Japan | G06F 11/28 |

OTHER PUBLICATIONS

Kneen, J. "Logic Analyzers for Microprocessors", Hayden Book Co. Inc. p. 104, 1980.
A Standard Test Bus and Boundary Scan Architecture, TI Technical Journal, Jul.–Aug. 1988, pp. 48–59.

Primary Examiner—Robert W. Beausoliel, Jr.
Assistant Examiner—Stephen C. Elmore
Attorney, Agent, or Firm—Gerald E. Laws; Robert D. Marshall, Jr.; Richard L. Donaldson

[57] ABSTRACT

A method for testing a digital processor 11 in which a test port 1149 is used to transfer trace data from the digital processor to a test host processor 1101 under control of a user definable program which executes in response to predetermined events on the digital processor. Trace data is gathered while an application program loaded in program memory 61 is executed by the digital processor. Trace data is temporarily stored in a trace region 99 of data memory 25 by user definable code which is executed in a background manner by the digital processor in response to trigger events. The trigger events are also enabled by user definable code which enables various portions of analysis hardware 1217. Trace data is transferred from the digital processor to the test host processor through test port 1149 by sending a notification signal to the test host processor by means of message passing register 1216. The digital processor then monitors the message passing register for a handshake signal from the test host processor. When a handshake signal is received, trace data is written into the message passing register by user definable code in a background manner and transferred to the test host processor.

19 Claims, 14 Drawing Sheets

METHOD FOR TESTING AN INTEGRATED CIRCUIT WITH USER DEFINABLE TRACE FUNCTION

This application claims the benefit of U.S. Provisional Application No. 60/008,617, filed on Dec. 14, 1995.

FIELD OF THE INVENTION

This invention relates to electronic data processing and emulation, simulation, and testability devices and systems, and methods of their manufacture and operation.

BACKGROUND OF THE INVENTION

Advanced wafer lithography and surface-mount packaging technology are integrating increasingly complex functions at both the silicon and printed circuit board level of electronic design. Diminished physical access is an unfortunate consequence of denser designs and shrinking interconnect pitch. Designed in testability is needed, so that the finished product is still both controllable and observable during test and debug. Any manufacturing defect is preferably detectable during final test before a product is shipped. This basic necessity is difficult to achieve for complex designs without taking testability into account in the logic design phase, so that automatic test equipment can test the product.

In addition to testing for functionality and for manufacturing defects, application software development requires a similar level of simulation, observeability and controllability in the system or sub-system design phase. The emulation phase of design should ensure that an IC (integrated circuit), or set of ICs, functions correctly in the end equipment or application when linked with the software programs.

With the increasing use of ICs in the automotive industry, telecommunications, defense systems, and life support systems, thorough testing and extensive real-time debug becomes a critical need.

The advances in IC design, for example, are accompanied by decreased internal visibility and control, reduced fault coverage and reduced ability to toggle states, more test development and verification problems, increased complexity of design simulation and continually increasing cost of CAD (computer aided design) tools. In the board design the side effects include decreased register visibility and control, complicated debug and simulation in design verification, loss of conventional emulation due to loss of physical access by packaging many circuits in one package, increased routing complexity on the board, increased costs of design tools, mixed-mode packaging, and design for produceability. In application development, some side effects are decreased visibility of states, high speed emulation difficulties, scaled time simulation, increased debugging complexity, and increased costs of emulators. Production side effects involve decreased visibility and control, complications in test vectors and models, increased test complexity, mixed-mode packaging, continually increasing costs of automatic test equipment even into the 7-figure range, and tighter tolerances.

Accordingly, it is an object of the invention to provide improved emulation, simulation and testability architectures and methods which provide visibility and control without physical probing or special test fixtures.

Another object of the invention is to provide improved emulation, simulation and testability architectures and methods to reduce application development time and thus reduce the time-to-market on new products.

Other objects and advantages will be apparent to those of ordinary skill in the art having reference to the following figures and specification.

SUMMARY OF THE INVENTION

In accordance with the present invention, a method for testing a digital processor which has a memory portion, a test port, and a message register is provided. The method comprises defining an area of the memory portion as a trace region, executing an application program on the digital processor until a trigger event occurs, storing a data item in a location in the trace region in response to the trigger while the digital processor continues to execute the application program, and transferring the data item to a test host processor through the test port while the digital processor continues to execute the application program.

Another aspect of the present invention is a method for testing a digital processor having a memory portion, a test port, and a message register which comprises the following steps: (1) defining an area of the memory portion as a trace region, (2) executing an application program on the digital processor until a trigger event occurs, (3) storing a data item in a location in the trace region in response to the trigger event while the digital processor continues to execute the application program, repeating steps 2 and 3 until the trace region is full, and (4) transferring at least one data item to a test host processor through the test port by moving the data item from the trace region to the message passing register by means of instructions which are executed under control of the data processor while the digital processor continues to execute the application program.

Another aspect of the present invention involves sending a notification signal through the test port from the digital processor to the test host processor when at least one of the data items is in the trace region and waiting for a handshake signal through the test port from the test host processor to the digital processor to indicate that the test host processor is ready to accept the data item from the digital processor.

BRIEF DESCRIPTION OF THE DRAWINGS

Other features and advantages of the present invention will become apparent by reference to the following detailed description when considered in conjunction with the accompanying drawings, in which.

Prior art

Prior art

Prior art

Prior art

Prior art

Prior art

Prior art

Prior art

Prior art

Prior art

Prior art

Prior art

Prior art

Corresponding numerals and symbols in the different figures and tables refer to corresponding parts unless otherwise indicated.

DETAILED DESCRIPTION OF THE INVENTION

Various inventive electronic architectures, devices, systems and methods were described extensively in the detailed description an drawings of the commonly assigned application with U.S. Pat. No. 5,072,418 and U.S. Pat. No. 5,329,471. These foregoing commonly assigned applications are incorporated herein by reference. Corresponding numerals in this application and said commonly assigned applications refer to corresponding parts for discussion clarity.

Figure 1:
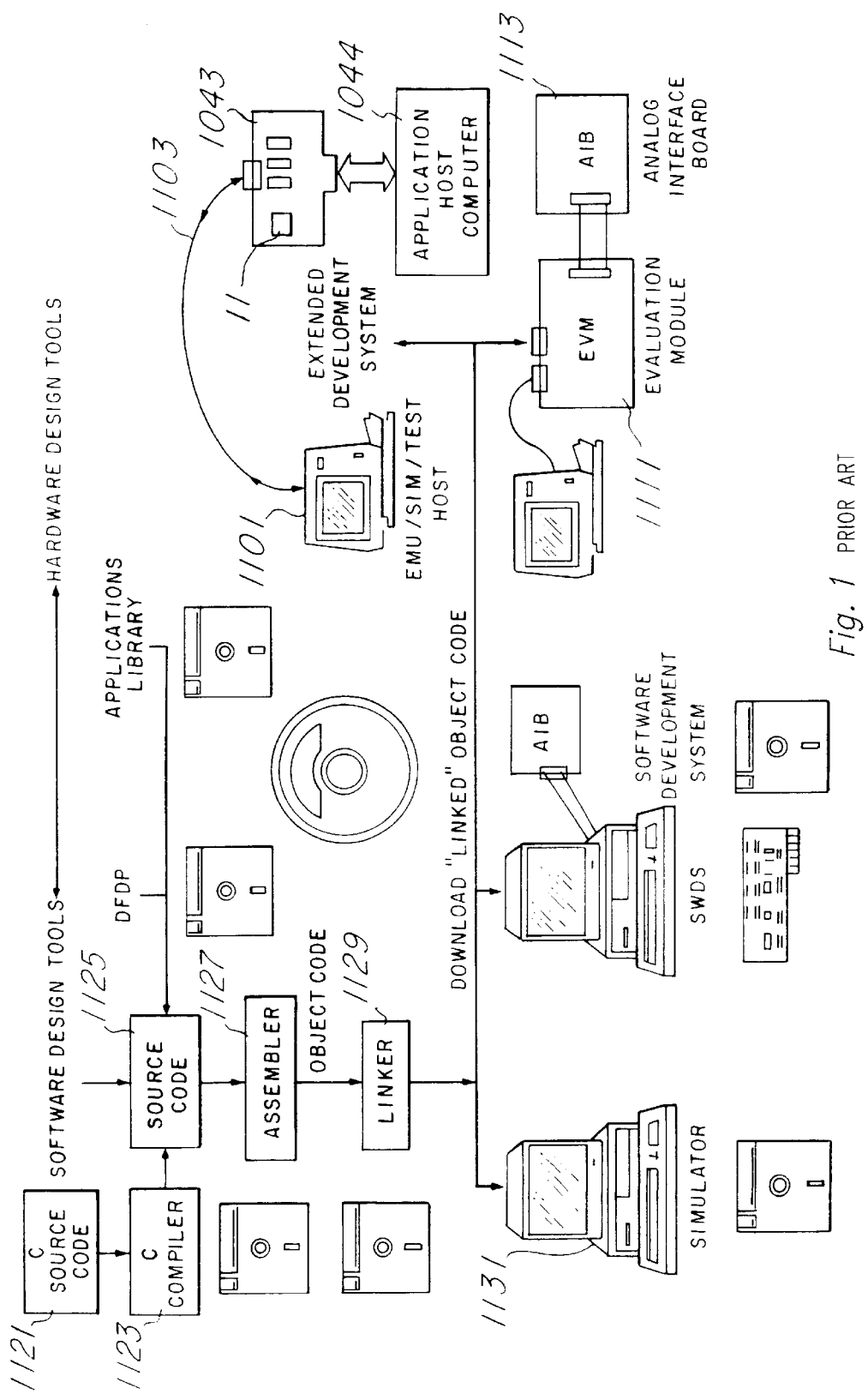
FIG. 1 is a pictorial diagram of development tools for developing integrated circuit chips and software.

A processor device (CPU) 11, described in the commonly assigned applications and further described herein, is adapted for sophisticated interfacing with development tools illustrated in FIG. 1. Hardware design tools include an extended development system 1101 (referred to also as test host 1101) interfaced by a serial line 1103 to a circuit board 1043 holding device 11. Circuit board 1043 is advantageously operable with application host computer 1044. Also provided in the development tools are an evaluation module 1111 connected to an analog interface board AIB 1113.

In FIG. 1, a software development system SWDS provides for user entry of source code 1121 for an application program in the C computer language. The source code is compiled by a C compiler 1123 into assembly code 1125. After being assembled and linked by assembler 1127 and linker 1129, the resultant object code program is downloaded to board 1043 where it is executed by digital processor 11.

Once the program is downloaded and executed, it may need to be debugged. Tracing various aspects of the program as it is executed is a known technique for debugging a program. However, limited access to internal address and data busses of digital processor 11 can make tracing impossible. An aspect of the present invention is that an area of memory within processor 11 can be designated as a trace region and then various data items can be transferred into the trace region in response to a trigger event. The contents of the trace region can be transferred to test host processor 1101 via serial line 1103 in a manner that allows the application program to continue execution. The trace data can be examined on test host 1101 without disturbing the operation of the application program. This advantageously allows program execution to proceed until some completion point is reached, while at the same time gathering trace information to support the debug effort for understanding how the program execution progressed.

The interaction of the software development system, test host 1101 and processor 11 will now be described in detail. Returning to FIG. 1, C compiler 1123 is an optimizing compiler fully implementing the standard ANSI C language, for instance. The compiler 1123 accepts programs written in C and produces assembly language source code, which is then converted into object code by the assembler 1127. This high-level language compiler 1123 allows time-critical routines written in assembly language to be called from within the C program. Conversely, assembly routines may call C functions. The output of the compiler is suitably edited before assembly and link to further optimize the performance of the code. The compiler 1123 supports the insertion of assembly language code into C source code, so that the relative proportions of high-level and assembly language code are tailored according to the needs of a given application.

The code 1125 is assembled by an assembler 1127 into relocatable object code. A linker 1129 produces non-relocatable machine code or linked object code which is then downloaded into the device 11 through the development system.

Assembler 1127 and linker 1129 comprise a software development tool that converts assembly language files into executable object code. Key features are macro capabilities and library functions, conditional assembly, relocatable modules, complete error diagnostics, and symbol table and cross reference. Four programs that address specific software development needs are discussed next.

(1) The assembler 1127 translates assembly language source files into machine language object files. Source files contain instructions, assembler directives and macro directives. Assembler directives are used to control various aspects of the assembly process, such as the source listing format, data alignment and section content.

(2) The linker 1129 combines object files into a single executable object module. As the linker creates an executable module, it performs relocation and resolves external references. The linker accepts relocatable object files created by the assembler as input. It also accepts archive library members and output modules created by a previous linker run. Linker directives allow combining or binding of file sections or symbols to addresses and defining or redefining global symbols.

(3) An archiver allows collection of a group of files into a single archive file. For example, several macros are suitably collected into a macro library. The assembler searches through the library and uses the members that are called as macros by the source code 1125. The archiver also suitably collects a group of object files into an object library such as files that resolve external references during linking.

(4) An object format converter converts an object file into any one of several EPROM programmer formats, such as TI-TAG format. The converted file is then downloaded to an EPROM programmer so that the EPROM code so established is then executed on the device 11 target chip in system 1043.

According to the present invention, user defined trace code may be written in C or assembly language, for example. Various trace routines may also be encapsulated as macros which can be easily incorporated into an application program. The trace code responds to a trigger event and transfers a data item, such as a program counter address, a memory address, or a register content for example into an area in internal memory that is designated as a trace region.

Simulator 1131 executes a software program that simulates operation of the target chip for cost-effective software development and program verification in non-real-time. The simulator simulates the entire target chip instruction set and simulates the key peripheral features including DMA, timers and serial port when the target chip includes them. Command entry is accepted from either menu-driven keystrokes (menu mode) or from a batch file (line mode). Help menus are provided for all screen modes. Its standard interface can be user customized. Simulation parameters are quickly stored/retrieved from files to facilitate preparation for individual sessions. Reverse assembly allows editing and reassembly of source statements. Data in memory is displayed as hexadecimal 32 bit values and assembled source code, separately or at the same time.

Simulator 1131 execution modes include 1) single/ multiple instruction count, 2) single/multiple cycle count, 3) Until Condition Is Met, 4) While Condition Exists, 5) For Set Loop Count and 6) Unrestricted Run with Halt by Key Input. Trace expressions are readily defined. In trace execution, display choices include 1) designated expression values, 2) cache registers, and 3) instruction pipeline for easy optimization of code. Breakpoint conditions include Address Read, Address Write, Address Read or Write, Address Execute, and Expression Valid. Simulator 1131 simulates cache utilization and does cycle counting. For example, in cycle counting the number of clock cycles in single step mode or run mode are displayed. External memory is suitably configured with wait states for accurate cycle counting.

Simulator 1131 accepts object code produced by the assembler 1127 and linker 1129. Input and output files are suitably associated with the port addresses of the I/O instructions to simulate I/O devices connected to the processor. Before starting program execution, any breakpoints are set and the trace format defined.

During program execution on simulator 1131, the internal registers and memory of the simulated target chip are modified as each instruction is interpreted by the simulator 1131. Execution is suspended when a break-point or error is encountered or when execution is halted. When program execution is suspended, the internal registers and both program and data memories can be inspected and modified. A trace memory is also displayable. A record of the simulation session can be maintained in a Journal file so that it can be re-executed to regain the same machine state during another simulation session.

The simulator 1131 allows verification and monitoring of the state of the target chip without the requirements of hardware. Simulation speed is on the order to hundreds or thousands of instructions per second depending on the operating system and hardware selected for simulator 1131. A state-accurate simulation might be as slow as 1–2 instructions per second. Emulation at the higher real-time functional clock rate is performed by development system 1101 instead of simulator 1131.

Simulator 1131 provides for complete computer simulation not only of the device 11, but also its peripherals on the board 1043 through file I/O for example.

Extended development system 1101 provides full-speed, in-circuit emulation for system design and for hardware and software debug on widely available personal computer systems. The development tools provide technological support from system concept to final production with ease of use and offer the designer the tools needed to significantly reduce application system development time and cost.

An advantage of the present invention is that user defined tracing can be performed in development system 1101 which provides similar information as the software simulated trace, even though the internal busses are not directly available to the development system.

Figure 2:
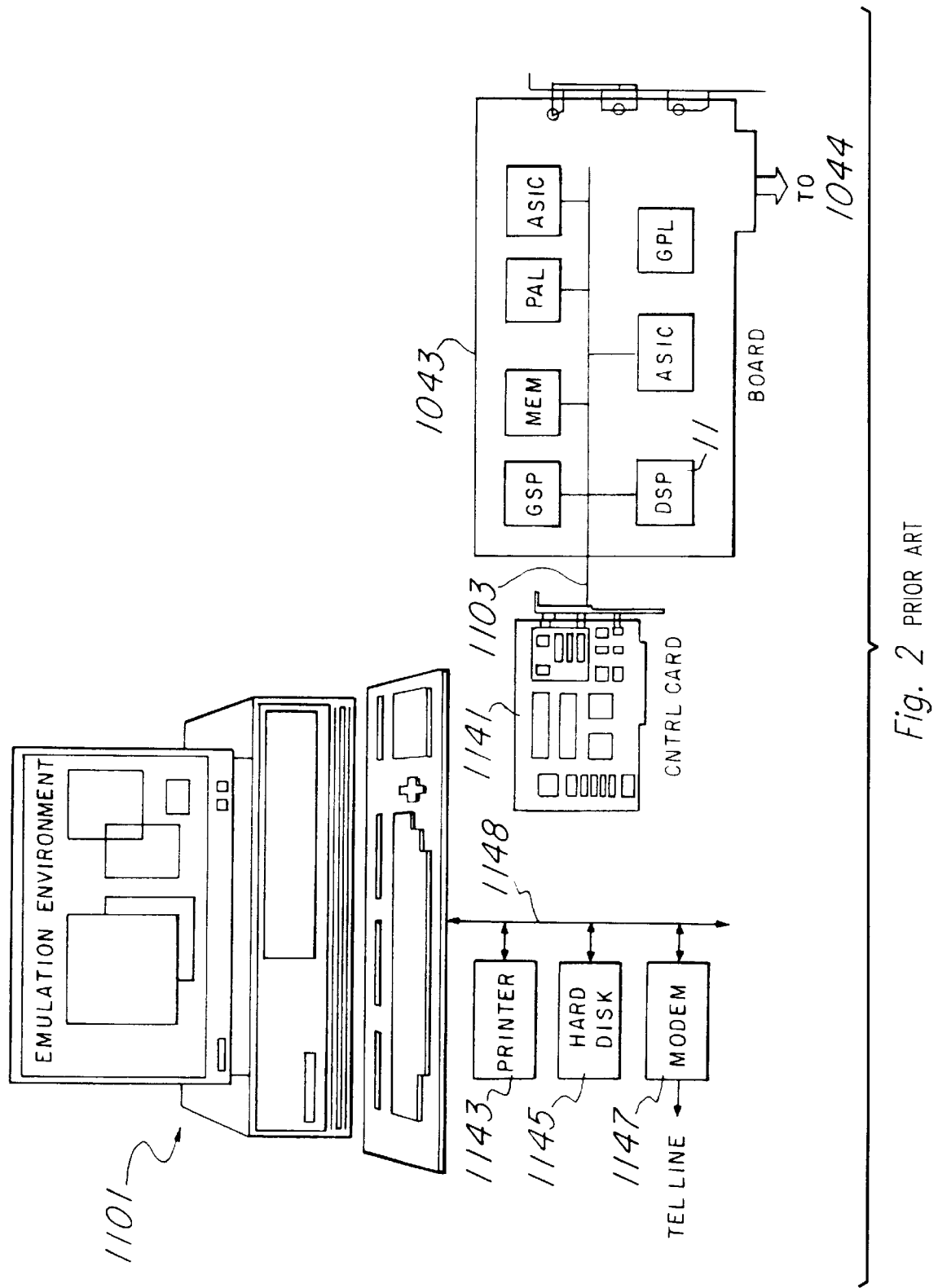
FIG. 2 is a partially pictorial, partially block diagram of a system configuration for emulation, simulation, testability and attached processor data processing, communications I/O and peripheral access.

FIG. 2 illustrates in even more detail the emulation environment provided by the extended development system 1101. A controller card 1141 compatible with IEEE JTAG standards is included in the emulation host computer 1101. JTAG is explained in detail in IEEE documents 1149.1, 1149.2, and 1149.3. Controller card 1141 communicates by serial line 1103 to PC board 1043 and DSP device 11 of FIG. 2. System 1043 has Texas Instruments Scope (TM) testability meshed with Texas Instruments MPSD (Modular Port Scan Design) emulation for a complete solution from development, through manufacture, and including field test. The inventive approaches are applicable in digital signal processors (DSP), graphics signal processors (GSP), memories (MEM), programmable array logic (PAL), application specific integrated circuits (ASIC), and general purpose logic (GPL) general purpose Micro Computers and Micro processors, and any device requiring test or code development.

Host computer 1101 of FIG. 2 has peripherals including a printer 1147, hard disk 1145, and telecommunications modem 1143 connected to a telephone line for uploading to a remote mainframe in field tests and other procedures. The peripheral capabilities of bus 1148 of host computer 1101 are not only available for emulation, but also provide access by application system 1043 to these peripherals along serial line 1103. Host computer 1101 thus is not only available to the system 1043 as an emulation host but also as an attached processor itself and as a port for communications I/O and to other peripheral capabilities temporarily needed by system 1043 but ordinarily unavailable to system 1043.

Figure 3:
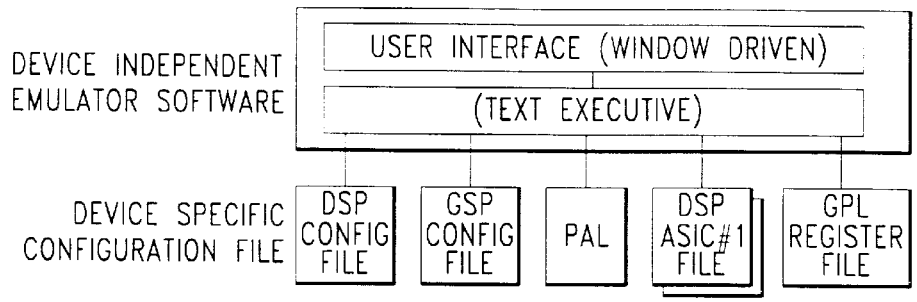
FIG. 3 is a diagram of a software configuration for a host computer of FIG. 2.

FIG. 3 illustrates an emulation and simulation software configuration for computer 1101 wherein device independent emulator software has a window driven user interface and a test executive program.

Device specific configuration files for each of the devices on board 1043 are provided. For example, there is a DSP configuration file, a GSP (graphic signal processor) configuration, a programmable array logic (PAL) file, an ASIC file and a GPL register file.

The emulation hardware and software of FIGS. 2 and 3 provide a user-friendly, personal-computer or work station-based development system which provides all the features necessary to perform full-speed in-circuit emulation with target chips on board 1043. For example, DSP 11 is suitably a Texas Instruments 320 series digital signal processor disclosed in commonly assigned U.S. Pat. No. 4,912,636 and hereby incorporated herein by reference; or a 320C50 digital signal processor disclosed in U.S. Pat. No. 5,072,418 which is incorporated herein by reference. An exemplary graphics signal processor is the Texas Instruments 34020.

The emulator comprised of FIG. 2 host computer 1101 with controller card 1141 and software of FIG. 3 allows the user to perform software and hardware development, and to integrate the software and hardware with the target system. An emulation interface provides control and access to every memory location and register of the target chip and extends the device architecture as an attached processor.

Emulator controller card 1141 provides full-speed execution and monitoring of each target chip such as device 11 in the user's target system 1043 via a multi-pin target connector. In one embodiment, software and hardware breakpoints, software and hardware trace and timing, and single-step execution are provided. The emulator has capability to load, inspect, and modify all device 11 registers. Program data and program memory can be uploaded or downloaded. The user interface of host computer 1101 for emulation purposes is a windowed user interface designed to be identical to the windowed user interface of simulator 1131 for the corresponding target chip. The emulator 1101 is portable and reconnectable for multiprocessing. Emulator 1101 provides a benchmark of execution time clock cycles in real-time.

Full-speed execution and monitoring of the target system is suitably controlled via a multi-wire interface or scan path in the multi-pin target connector. The scan path controls the target chip in the system 1043, providing access to all the registers as well as associated internal and external memory.

Program execution takes place on the target chip (e.g. 11) in the target system 1043. Accordingly, there are not timing differences during emulation, as might occur without the in-circuit emulation provided by this preferred embodiment. Advantageously, the present embodiment is a non-intrusive system that utilizes chip 11 itself, and avoids cable length and transmission problems. Loading problems on signals are avoided, and artificial memory limitations are obviated. Emulation performance coincides with specifications for the emulated target chip itself.

Software breakpoints allows program execution to be halted at a specified instruction address. Hardware breakpoints are also advantageously operative on-chip. When a given breakpoint is reached, the program either halts execution to permit user observation of memory and status registers, or the breakpoint is included in a more complex condition, which when satisfied results in an appropriate stop mode being executed. At this point, the status of the target chip or system is available for display by the user with as little as a single command.

An advantage of the current invention is that a user definable software routine can respond to the breakpoint event, transfer relevant information to the trace region, and then continue execution of the application program with only minimal effect on the operation of the application program.

Software trace and hardware program counter trace permit the user to view the state of target chip 11 when a breakpoint is reached. This information is suitably saved on command in a file for future analysis. Software timing allows the user to track clock cycles between breakpoints for benchmarking time critical code.

Single-step execution gives the user the ability to step through the program one instruction at a time. After each instruction, the status of the registers and CPU are displayed. This provides greater flexibility during software debug and helps reduce development time.

Object code is downloaded on command to any valid program memory location or data memory location via the interface. Downloading a 1 K-byte object program illustratively takes on the order of 100 milliseconds. By inspecting and modifying the registers while single-stepping through a program, the user can examine and modify program code or parameters.

A windowed user interface for emulator 1101 is suitably made identical to that of simulator 1131, affording a straightforward migration from simulator-based development to emulator-based development. The user-friendly screen displays the program code in mnemonics and equivalent hexadecimal code. Windowed displays are suitably provided for extended precision registers, the CPU status and memory locations.

A first screen option is a primary screen that includes a command line displayed at top of screen, functions of special-function keys, and four status windows which are individually accessed using the F1 key of commercially available keyboards. The windows include a source code window, an auxiliary display window, a CPU status window, and an extended precision registers window. The contents of the windows are made accessible for user inspection and modification.

Commands are entered in a MENU mode or a LINE mode. In the MENU mode, a menu at the top of the screen permits the user to view every option available while entering a single command. Further menus are then displayed until the entire command has been entered. The LINE mode allows user to enter an entire command expression.

Emulator card 1141 of FIG. 2 suitably occupies slots in an IBM PC-compatible computer when the latter is used as host computer 1101. The card 1141 is detached and transferred to another PC (personal computer of equivalent functionality) as needed, affording emulator portability. For simulation, a memory map for the controller card 1141, which may include EPROM (erasable programmable read only memory), SRAM (static random access memory), DRAM (dynamic random access memory), and on-chip memory and peripherals, can be configured by the designer to reflect the actual environment of the target system 1043, including wait states and access privileges. In this way, card 1141 and host computer 1101 can simulate peripherals which are absent from board 1043 in a particular development context.

In one embodiment, multiprocessing applications are emulated by extending line 1103 between each of several application boards from one to the next, maintaining real-time emulation and preserving the information on each target chip.

The development system 1141 operates in two modes: 1) emulation mode and 2) algorithm development and verification mode. In the algorithm development/verification mode, the target chip 11 debugs its software at full speed before the target system is complete. To accomplish this, code is downloaded into the memory on the board 1043 and executed at full speed via the interface on an application board used in place of the incomplete target system. A suitable application board includes a DSP 11, 16K×32 bits of full-speed (zero wait states) SRAM on a primary bus, two selectable banks of 8K×32 bits full speed (zero wait state) SRAM on an expansion bus, and 512K×32 bits DRAM. With ample SRAM, the user has real-time emulation capabilities and memory storage flexibility for a variety of algorithms. Zero wait state capability in SRAM allows memory read/write in real-time.

For algorithm development and code verification the system can single step and run until breakpoint is reached. Advantageously, according to the present invention, the application program can continue running after the breakpoint is reached and information has been transferred to the trace region. Algorithm verification runs data through the algorithm and verifies its function. Burst execution, I/O and other functions are available.

Page mode DRAM improves bulk storage performance. Three types of DRAM cycles are used on one example of an application board. These are single-word read, single-word write and page-mode read which respectively have wait states of four, two, and one wait state per access. Page mode read cycles are automatically evoked when device 11 performs two or more back-to-back read cycles on the same memory page (256 words). Utilizing page-mode results in a decrease in wait states when accessing on application board 1043 DRAM on application board 1043.

In FIG. 2 both test and development support system access to the application system resource is via a serial scan bus master or scan interface on controller card 1141, and described later hereinbelow. Sophisticated emulation and stimulation functions are built out of primitives. Primitives are sets of bits that define control operations (like commands or instructions) available through controller card 1141.

Figure 4:
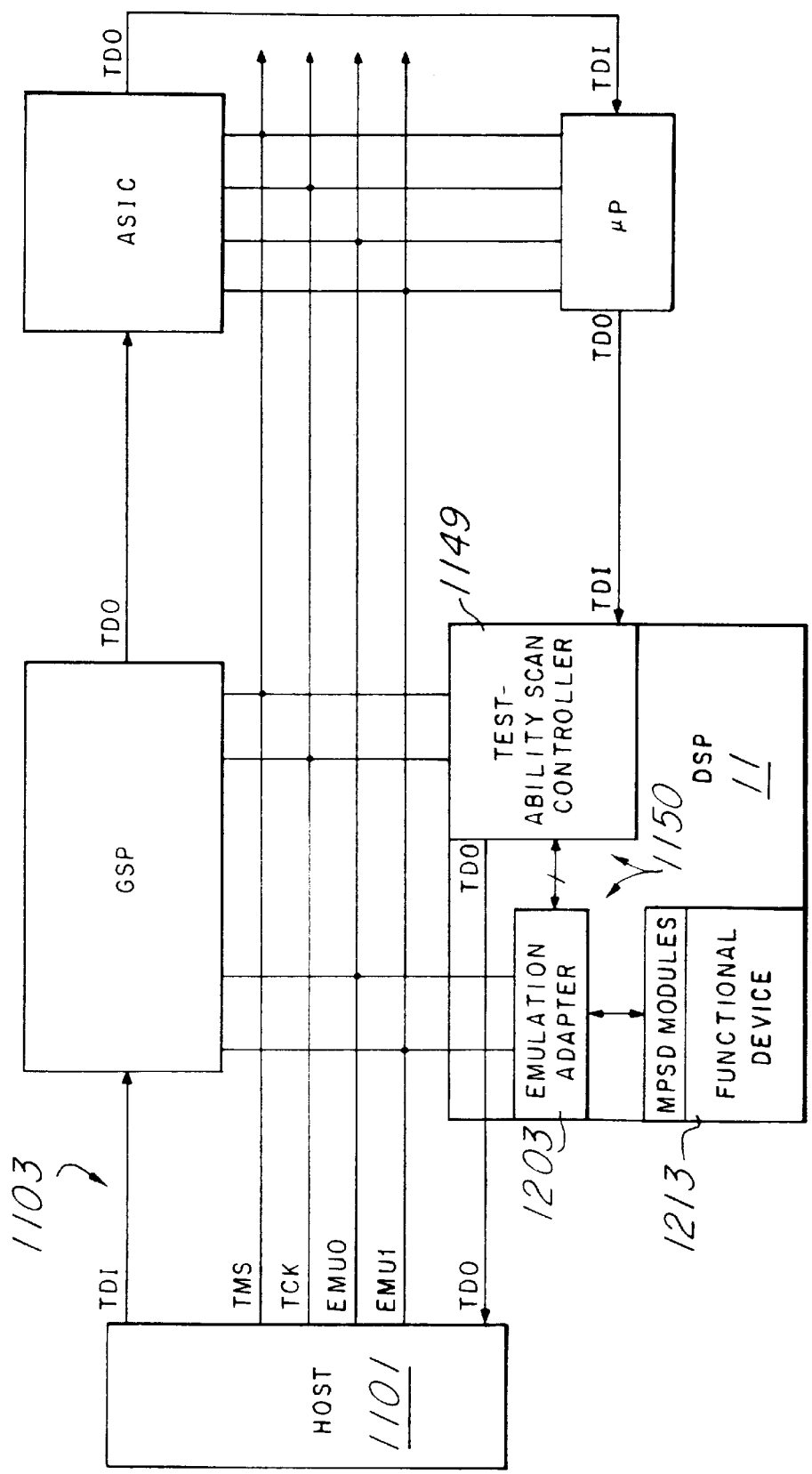
FIG. 4 is a block diagram of an integrated approach to test and emulation circuitry.

The functionality of the device 11 can be accessed by each of two illustrative serial implementations. A first illustrative serial implementations is Texas Instruments Modular Port Scan Design (MPSD) as shown in FIG. 4 MPSD module 1213 and disclosed in U.S. Pat. No. 4,860,290 and incorporated herein by reference. Shift register latches (SRLs) designated "S" are distributed through the device 11 like a string of beads on a serial scan path respective to each module to provide access to all "important" registers.

A second approach uses a SCOPE (Texas Instruments System Controllability, Observeability, and Partition Environment) transmission medium combined with MPSD technology in a SCOPE interface 1150 of FIG. 4.

In FIG. 4 device 11 also has an on-chip JTAG interface 1149 as described herein. The scan interface is connected to line 1103 of FIG. 2 and has inputs for test clock TCK, mode select TMS, and test data input TDI (scan in), as well as a test data output TDO (scan out). A special emulation adapter 1203 is connected between the scan interface 1149 and MPSD modules of the functional circuitry 1213 of device 11. Emulation adapter 1203 in different forms involves hardwired state machine circuitry, assembly language, or microcoded state machine embodiments.

The characteristics of some implementations when used in support of emulation are shown in Table I:

TABLE I

|  | MPSD | SCOPE | SCOPE/MPSD |
| --- | --- | --- | --- |
| Industry Standard Communication | No | Yes | Yes |
| Max Clock Period | Depends | Unlimited | Unlimited |
| Functional Clock Independence | No | Yes | Yes |
| Boundary Scan Support | No | Yes | Yes |
| Silicon Efficiency | Yes | No | Yes |
| Most Emulation Capability | No | Yes | Yes |
| Number of Extra Pins | Four | Six | Six |

The implementation SCOPE/MPSD capitalizes on the strengths of MPSD and SCOPE individually to create a hybrid emulation technology.

Figure 5:
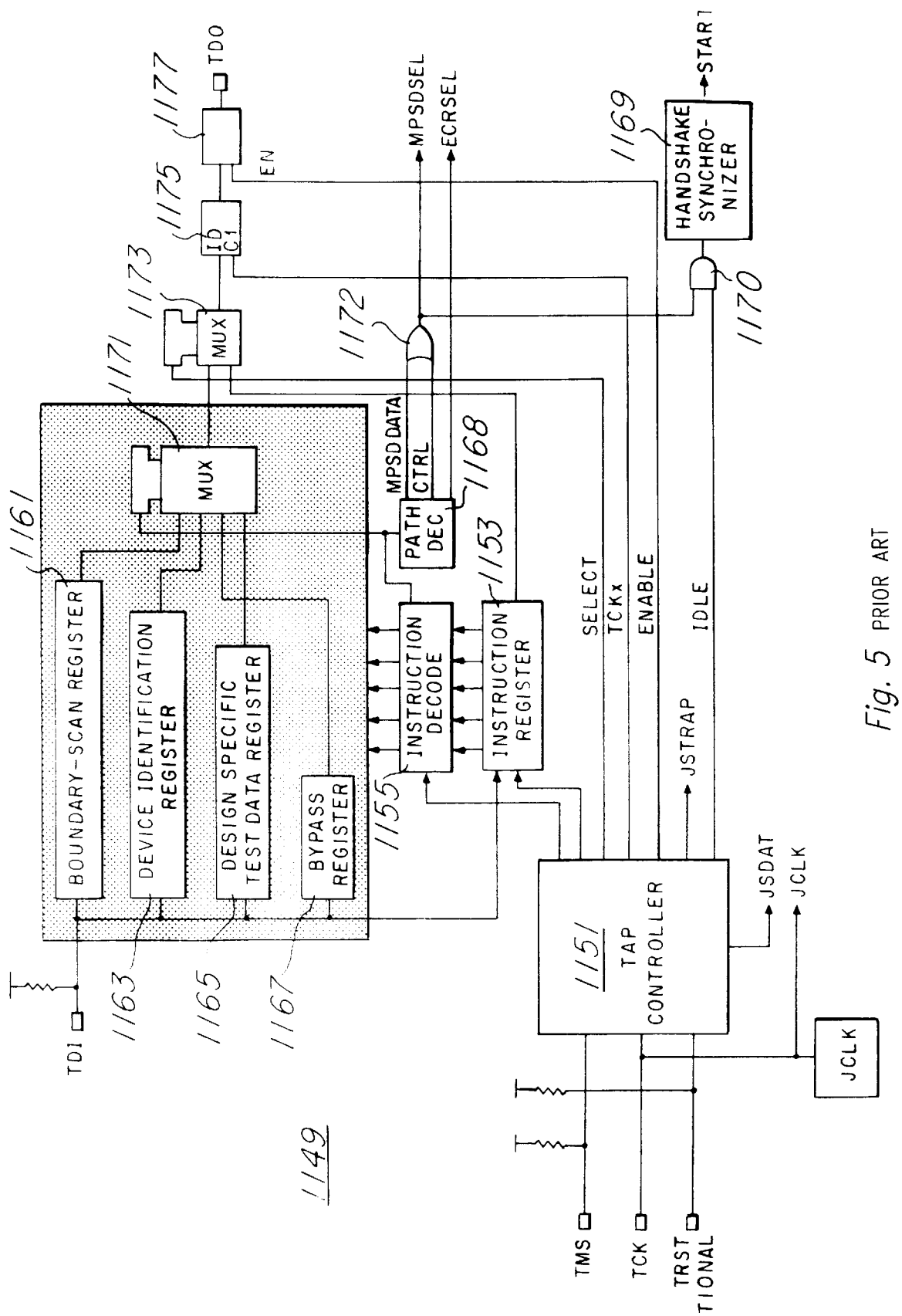
FIG. 5 is a partially block, partially schematic diagram of a scan testability interface.

FIG. 5 shows a block diagram of improved SCOPE hardware which is provided on each of the chips such as device 11 on PC board 1043. Four pins TDI, TMS, TCK and TDO communicate with the system. TMS and TCK communicate with a TAP controller 1151 which is connected to an instruction register 1153 and an instruction decoding circuit 1155.

Test access port (TAP) controller 1151 is in turn coupled to instruction register (IR) 1153 and a first multiplexer 1173. The instruction register can receive serial scan signals from the TDI line and output serially to MUX 1173. MUX 1173 is under control of the TAP and can select the output signal from the instruction register or from another MUX 1171.

The instruction register also controls a bypass register (BR) 1167 and one or more boundary scan registers (BSR) 1161. The bypass register receives the TDI signal and outputs it to MUX 1171. MUX 1171 is under control of the instruction register 1153. Based on the instruction loaded into the instruction register, MUX 1171 outputs its input from the bypass register or its input from one or more BSRs, or internal device register scan. Each boundary scan register is controlled via the test access port and the instruction register.

The boundary scan arrangement operates in a normal mode or a test mode. During the normal mode, input data entering terminals of an IC logic passes through the boundary scan register, into the IC logic and out to the normal output terminals without any change due to the BSR. During the test mode, normal input data is interrupted, and test input data is captured, shifted, and updated within the boundary scan register. The boundary scan register includes two latches, a first latch for receiving and shifting data from the TDI line and a second latch for holding output data. The second latch is selectively operable to transfer data from the first latch to the second latch.

Generally in FIG. 5, serial information is down loaded from emulation computer 1101 via the SCOPE controller card 1141 through pin TDI and enters any one of a number of shift registers, including a boundary scan register 1161, a device identification register 1163 and design specific test data registers 1165. A bypass register 1167 is also provided. These shift registers or serial scan registers are selected via a MUX 1171 under the control of instruction decode circuitry 1155. The selected output from MUX 1171 is fed to a MUX 1173 so that under control of tap controller 1151 the instruction register 1153 or MUX 1171 is selected by MUX 1173. JTAG clock TCK and MUX 1173 output are fed to flip flop 1175 which in turn is connected to a serial return circuit 1177 which is suitably enabled to return or send serial outputs from all parts of the on-chip JTAG circuitry back to computer JTAG card 1141 via output serial pin TDO.

The states of the JTAG TAP (Test Access Port) controller are described in "A Standard Test Bus and Boundary Scan Architecture" by L. Whetsel, Texas Instruments Technical Journal. Vol. 5, No. 4, 1988, pp 48–59 and U.S. Pat. Nos. 5,084,874 and 4,872,169.

Turning to basic concepts recognized and utilized herein, emulation involves hardware support built around each circuit so that operations can be executed within the circuit while doing analysis in parallel as the circuit runs. Emulation permits the circuits to be run at full speed in real time as the emulator computer 1101 monitors the circuits and starts and stops them. The user defines and develops software in the environment of the target system. Put another way, emulation reads inputs from the board 1043 and produces outputs to the board as if device 11 were absent, for the purpose of determining appropriate software and operation signals. Ultimately, when the device 11 is supplied with the appropriate software resulting from emulation work, the device 11 operates in a manner which is compatible with the rest of the circuitry of board 1043. Advantageously, in the improved system disclosed herein, the device 11 is actually on the board with the serial communication capabilities, and all of the operations of device 11 are monitored directly from the device itself. In view of the extremely high speed of device 11, the device itself assists in its own emulation.

In a previous approach, a cable is terminated in a pin-plug that mates to a socket provided on the board in place of the emulated device. The socket introduces a noise issue. A socket may be impractical when a surface mount device is to be emulated, due to limited board space. Advantageously, device 11 is soldered onto board 1043 and emulation is mediated by the device itself.

The few pins utilized by scan interface 1150 eliminate the need for conventional full pin-out target connectors and eliminate problems associated with cable reliability, transmission effects and timing differences. In this way, board 1043 can be probed to verify the operation of other logic circuits besides device 11 with logic analyzers and oscilloscopes in the improved system without physical or electromagnetic interference from a heavy cable connected to emulator 1101. Moreover, clock rates in excess of 20 megahertz for device 11 are so fast that previous emulation schemes may be incapable of emulating it.

Simulation as the term is used herein creates a software representation of the target board 1043 so that the entire board can be developed in simulation on simulator 1131 of FIG. 1 (or by running the simulator program on computer 1101). In another aspect of simulation, when the device 11 is available but the rest of the circuitry for target board 1043 is incomplete, the simulator can mimic the planned complete board by serial scan upload or download from device 11 to computer 1101, and then serial scan download or upload from computer 1101 to device 11 in substitution for the missing circuitry of board 1043. In this aspect, simulation is accelerated by running the device 11 itself at full speed according to the improvements described herein. Even when computer 1101 runs at a slower speed than device 11, simulation is effective to simulate peripherals which are accessed infrequently by device 11.

Test as the term is used herein has four difference areas. The first area, "Device Test," is test of a device 11 itself before the device manufacturer ships it.

The second area of test is "Device Verification" —verification of full functionality of the device in every aspect.

The third area of test is "Device Characterization". Characterization determines timing of the device to define exactly the way the actual manufactured device works.

The fourth area of test is "User Test." In user test, the entire board is tested so that the functionality of device 11 in the context of the entire board 1043 is examined.

Each MPSD module has two scan paths. One of the scan paths is termed the MPSD data path which usually has numerous shift register latches S (or SRL) serially interconnected like a string of beads throughout the module. The second scan path is termed the MPSD control path which generally has fewer shift register latches and which selects which MPSD data paths are to be scanned. These scan paths are described in previously referenced U.S. Pat. No. 4,860,290.

Figure 6:
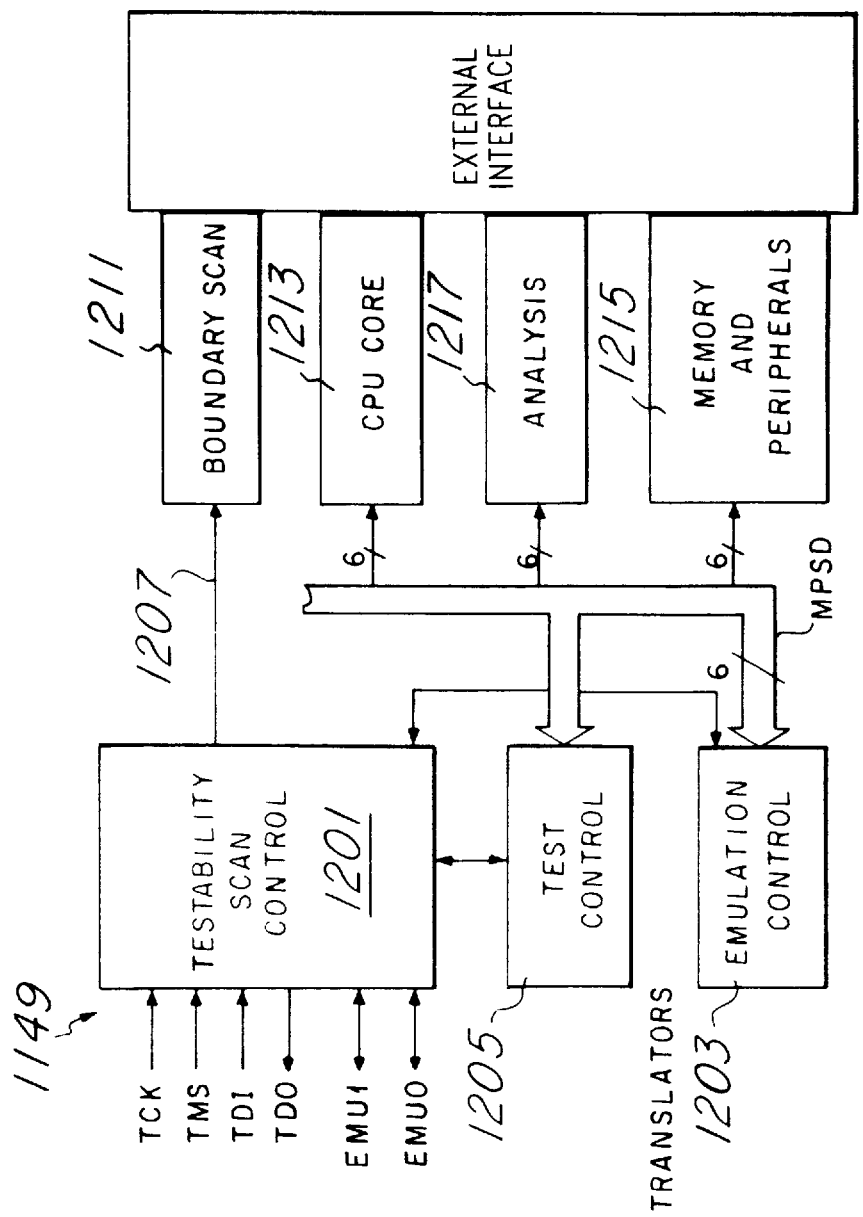
FIG. 6 is a block diagram of processor chip domains, boundary scan and scan test/emulation circuitry on chip.

In FIGS. 4 and 6, the improved emulation arrangement recognizes that device 11 is dividable into a few major areas which are clocked by different clocks when desired. These major areas are called clock domains or just "domains". The domains in a DSP device such as device 11 are suitably a CPU core domain 1213, memory and peripherals (system) domain 1215 and an analysis domain 1217. For another chip, the domains can be defined in whatever manner is consistent with the parts of the chip that are to be sometimes clocked from different clocks. However, for modularity of chip design, emulation and test, the modules should usually be smaller units than a whole domain. This affords greater flexibility in designing other chips using the modules as building blocks, and reduces the time required to scan data into modules (the time is a nonlinear power function of the size of the modules).

Accordingly, it is contemplated that each domain usually include more than one module. In FIG. 4, emulation adapter 1203 directs different clocks to the different domains or may supervise bit by bit transfers between the scan interface and a specific domain. Furthermore, adapter 1203 directs different MPSD control signals to the control paths of the different domains.

In FIG. 6, the on-chip emulation blocks are further illustrated wherein JTAG control is wrapped around the emulation according to MPSD (Modular Port Scan Design). Principles of modular scan testing are also disclosed in commonly assigned U.S. Pat. No. 4,701,921 which is also incorporated herein by reference.

The JTAG control of FIG. 5 is indicated as JTAG control block 1201 of FIG. 6. Emulation control according to MPSD is provided as a block 1203. Test control block 1205 links JTAG to MPSD. Serial scan line 1207 enters the serial bit stream into any one or more of the selected areas of boundary scan area 1211 which includes BSR 1161 of FIG. 5 and scans the pin boundary of device 11. The FIG. 6 domains: CPU core domain 1213, system domain 1215 and analysis domain 1217 interface to all of the various parts of the chip.

Figure 7:
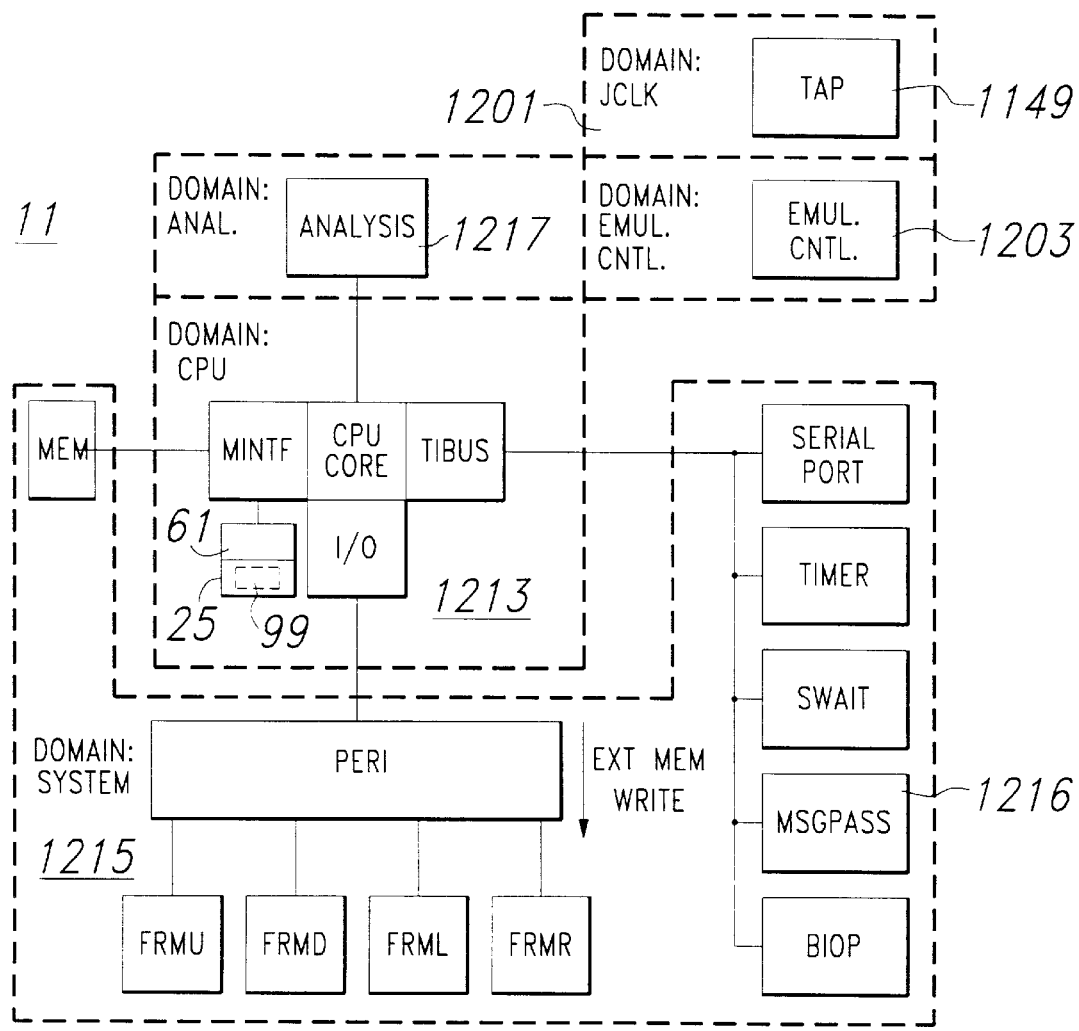
FIG. 7 is a block diagram of the processor chip of FIG. 6 showing functional blocks of the chip allocated to the various domains, and showing a trace region and a message passing circuit according to the present invention.

FIG. 7 provides a further perspective of the domains of device 11. The CPU core domain 1213 includes the circuitry of FIGS. 1A and 1B in incorporated by reference U.S. Pat. No. 5,072,418. Analysis circuitry is connected to the CPU core as described more fully herein. The analysis circuitry includes condition sensors such as hardware breakpoint sensors for controlled stops and trace stack circuitry for real-time trace record-keeping. The analysis circuitry is serial-scan accessible and designated the analysis domain 1217. All peripherals including memory and serial and parallel ports are denominated as the system domain 1215. Emulation control circuitry 1203 is a further domain of FIG. 7. Special message passing circuitry 1216 is also included in the system or analysis domain to allow easy communication between test host 1101 and processor 11 by interfacing a data bus of processor 11 to the serial scan line 1103 of FIG. 2. This will be explained in more detail with reference to FIG. 14. Program memory 61 and data memory 25 are also illustrated. These memory portions may be a single memory, but are preferably separate memories. According to the present invention, a trace region 99 is defined within data memory 25 under control of user software. Trace region 99 may vary in size for various debugging tasks.

Figure 8:
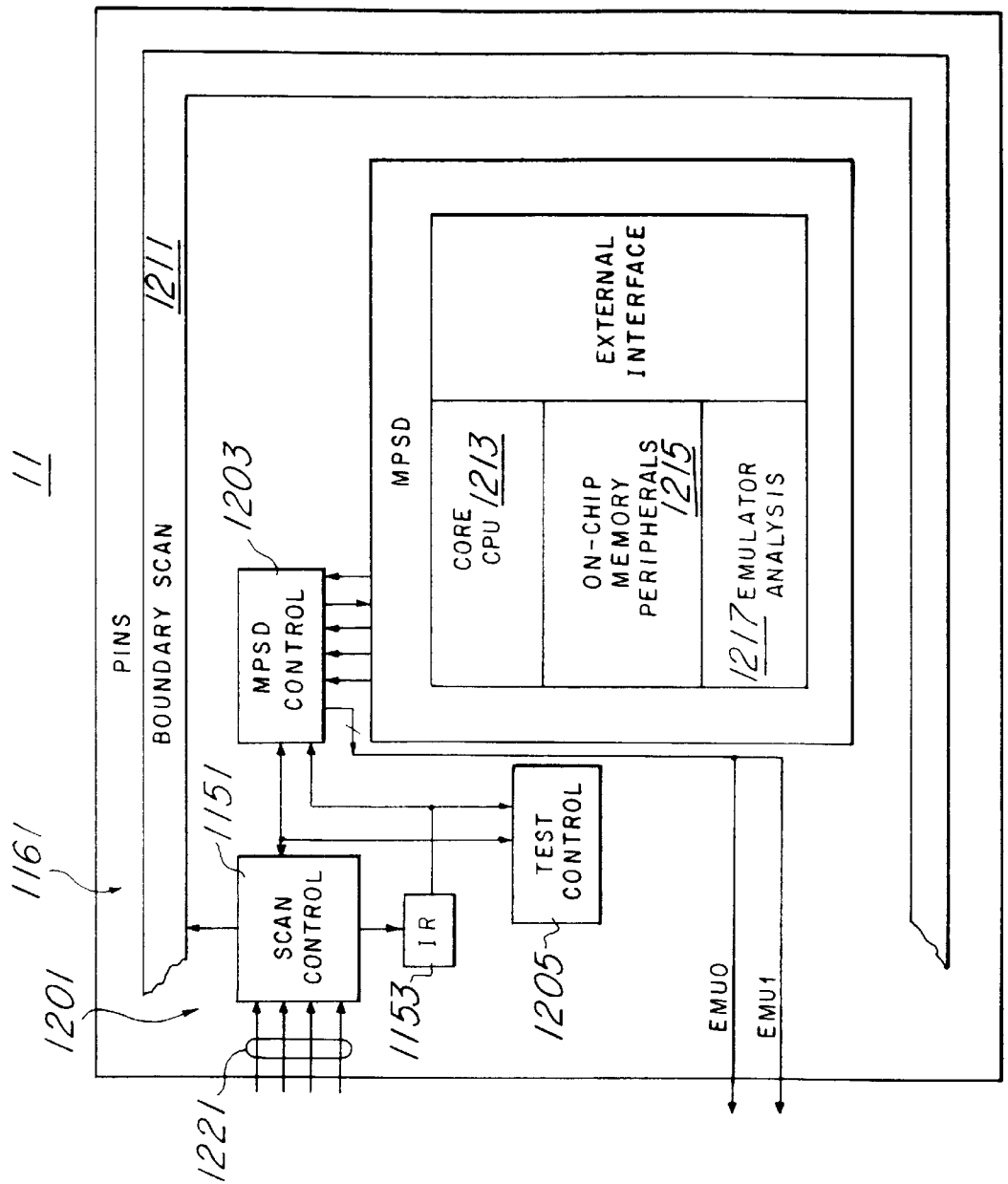
FIG. 8 is partially pictorial, partially block diagram of the processor chip of FIGS. 6 and 7.

FIG. 8 shows a physical perspective of the various domains on the chip of device 11. JTAG control 1201 interfaces with the pins via a serial boundary scan assembly including boundary scan register 1211 which allows all logic states at the actual pins 1161 of device 11 to be read or written. JTAG TAP controller 1151 and JTAG instruction register IR 1153 are provided on-chip. Test control 1205 and MPSD control 1203 are integrated into the circuitry. MPSD control 1203 serially interfaces with the domains for core 1213, system 1215 and analysis 1217 for the device 11. Bi-directional pins EMU0 and EMU1 are provided for external interfacing in addition to the four JTAG terminals 1221. Combining JTAG testability interface technology with MPSD modular port scan with the additional pins EMU0 and EMU1 synergistically opens up capabilities for integrating emulation, software development, and manufacturing and field test processes.

In FIGS. 7 and 8, the development system capabilities for the preferred embodiments address applications development support in a fashion that allows the selection of various test capabilities. Utilizing all of the disclosed development support hardware components provides development capabilities that include concurrency, on-chip breakpoint and trace in a manner that allows an application program to continue execution, and real-time message passing between the emulation controller 1101 of FIG. 2 and the device 11 of FIG. 7 can be included or omitted in cost sensitive applications. For example, a basic system would support basic MPSD (Modular Port Scan Design) emulation or at the extreme, no emulation and only test with or without a boundary scan.

The total development systems advantages in the areas of emulation, simulation, and chip speed measurement interrelate with various test and functional features. The preferred embodiments have three architectures, a) functional architecture, (e.g., CPU memory and I/O), b) test architecture including JTAG and MPSD serial scan-based testability circuitry and c) emulation/support architecture such as message passing circuitry, simulation is features, and boundary scan tests. The three architectures advantageously minimize test related complication of the CPU, memory and I/O functional architecture and maximize the synergism with test.

Figure 9:
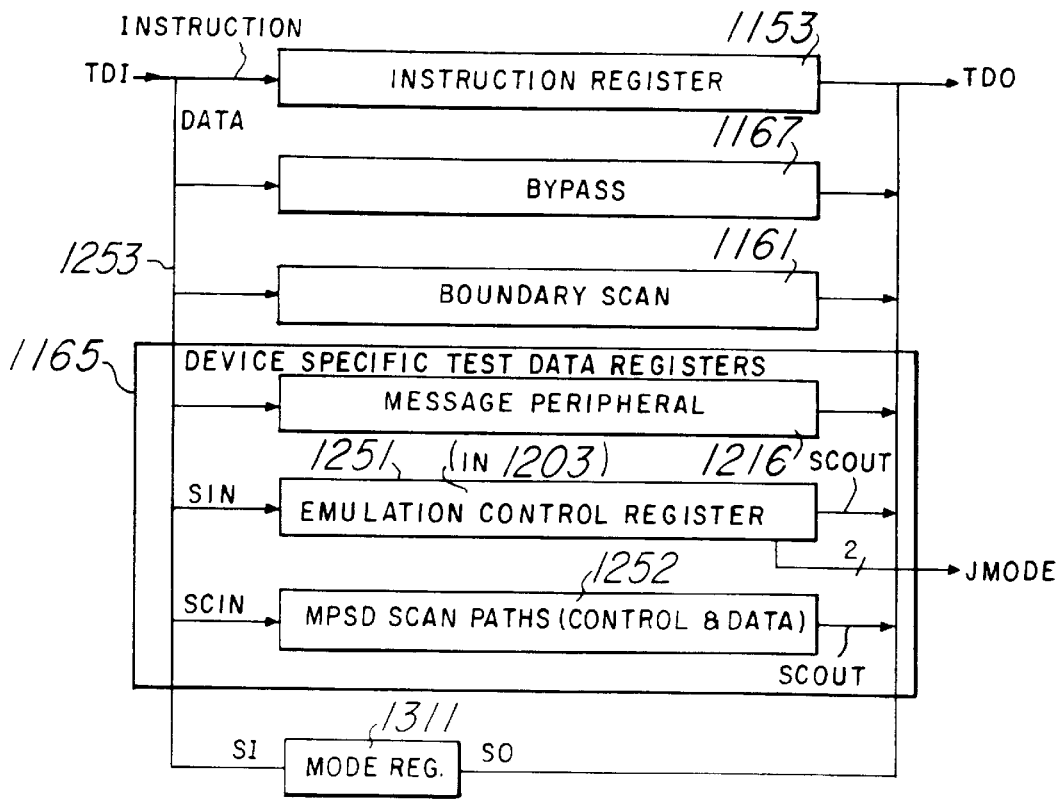
FIG. 9 is a block diagram of scan paths in greater detail than that of FIG. 5.

FIG. 9 shows a further diagrammatic perspective of the registers of FIG. 5 wherein JTAG instruction register IR 1153 is selected for scan between the terminals TDI and TDO. The IR 1153 is decoded in FIG. 5 to access the other serial shift registers or scan paths when requested by the control card 1141 of FIG. 2 via the serial line 1103. These shift registers are the bypass register 1167, the boundary scan register 1161, the message peripheral 1216 of FIG. 7, the emulation control register 1251 and a pair of MPSD scan paths 1252 in the various domains and modules in the domains.

Figure 10:
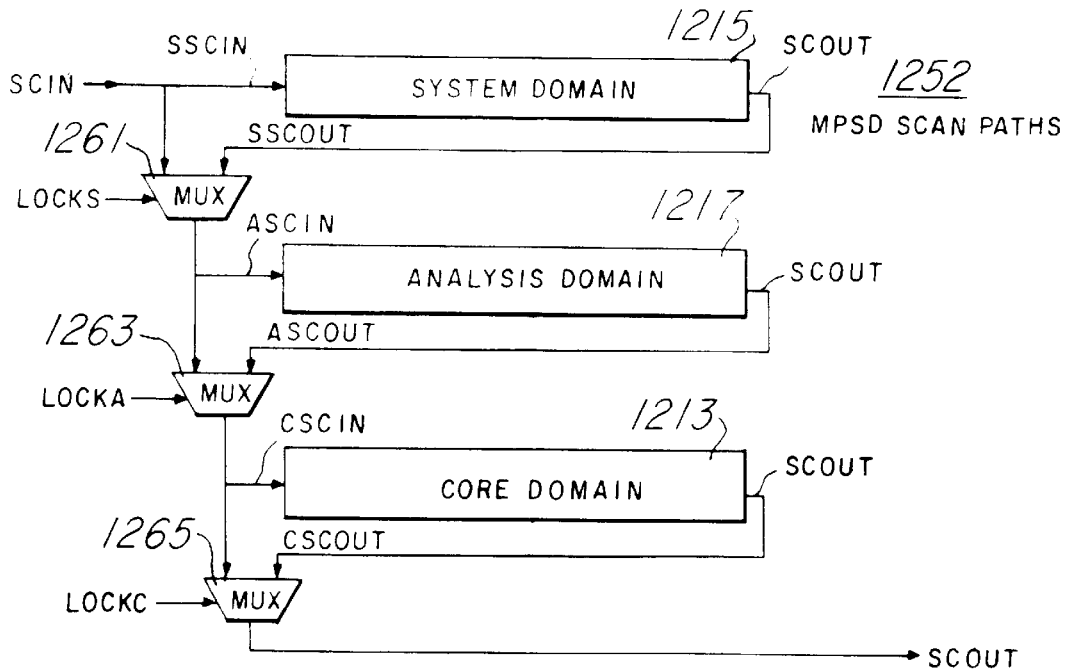
FIG. 10 is a block diagram of scan paths in greater detail than that of FIG. 9.

In FIG. 10, a scan line 1253 from FIG. 9 is denominated SCIN and this line is selectively connected to three scan paths 1252 wherein each of the three paths is internally split by internal MUX selection into an internal scan control path and a scan data path. A set of external MUXes 1261, 1263 and 1265 are controlled by lock signals LOCKS (lock system domain), LOCKA (lock analysis domain), and LOCKC (lock core domain) from emulation control 1203 to bypass all but a selected one domain, if any, for scan and execution purposes. A locked domain has the MPSD codes (discussed hereinbelow) which have been supplied to that domain remain frozen for the period the domain is locked. When any one domain (e.g. analysis domain) is to be scanned, its corresponding MUX 1263 deselects line ASCIN (analysis scan in data) and selects line ASCOUT (analysis scan out). In this way serial scan bits entering line SCIN enter analysis domain 1217 on line ASCIN, leave analysis domain via line ASCOUT, and bypass the other two domains. Each of the other two domains is selected analogously. Scan output exits through line SCOUT at the bottom of FIG. 10.

Figure 11:
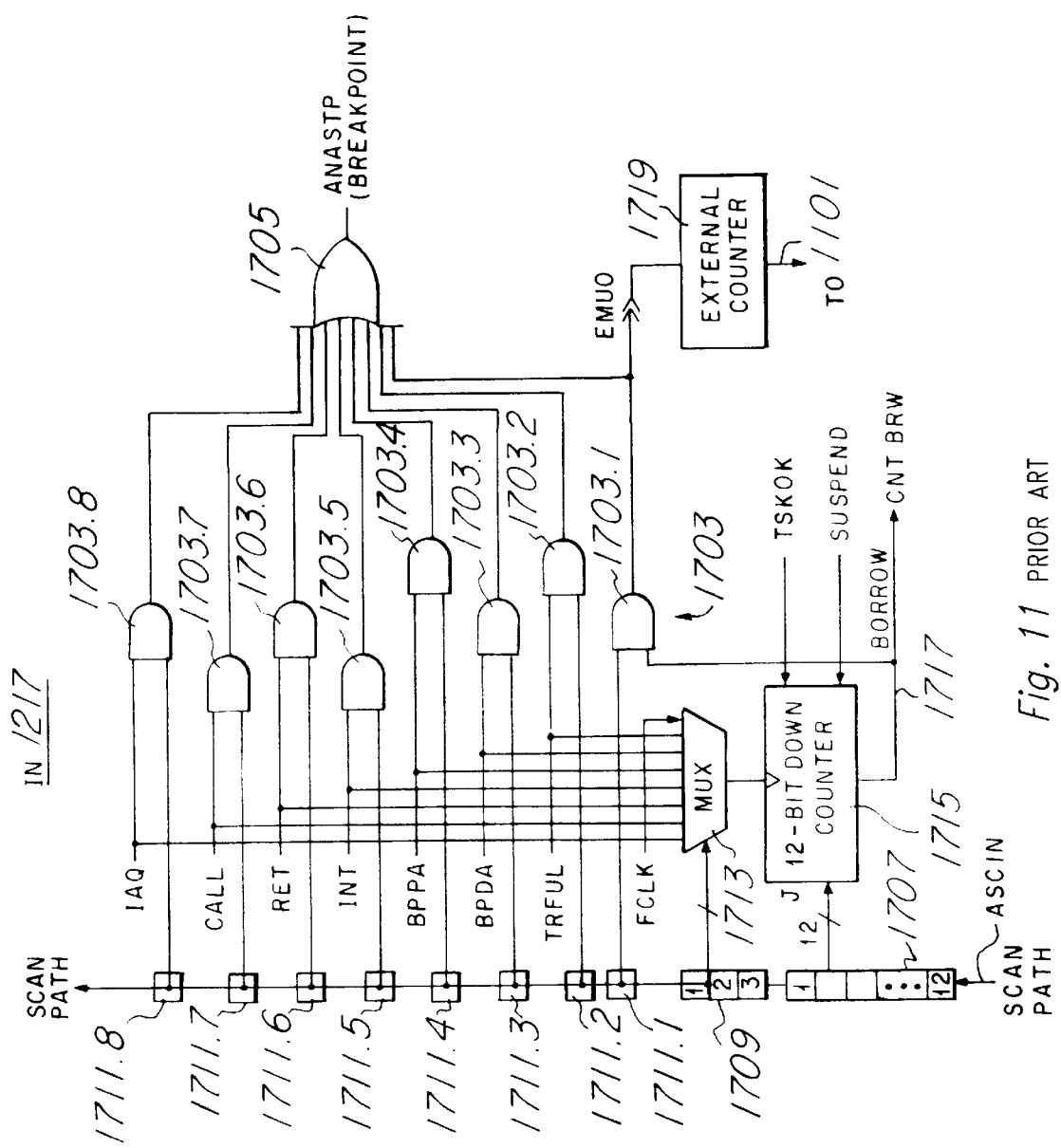
FIG. 11 is block diagram of an analysis circuit for monitoring the operations of an integrated circuit device.

FIGS. 11 and 2 and the description herein illustrate an electronic system that has a data processing device including a semiconductor chip and an electronic processor on the chip. Test host computer circuitry off-chip is connected to the data processing device via a test port, such as JTAG, as described previously. The data processing device 11 further has an on-chip hardware breakpoint address circuit, trace stack, pipeline controller condition sensing circuits and other on-chip condition sensors including the counter 1715 for signaling the processor in real time to create periodic trigger events or trigger events at particular times, as well as signaling to the test host computer. It is emphasized that the circuitry of FIG. 11 is but one example, and numerous variation can be provided by the skilled worker according to the principles set forth herein to provide sensor logic for any logical combination of conditions so that occurrences of any complex combination of conditions or sequence of conditions can be sensed. The breakpoint signal can be a stop signal ANASTP as illustrated or any other control signal besides a stop signal that should be responsive to sensed target logical/functional conditions.

Figure 12:
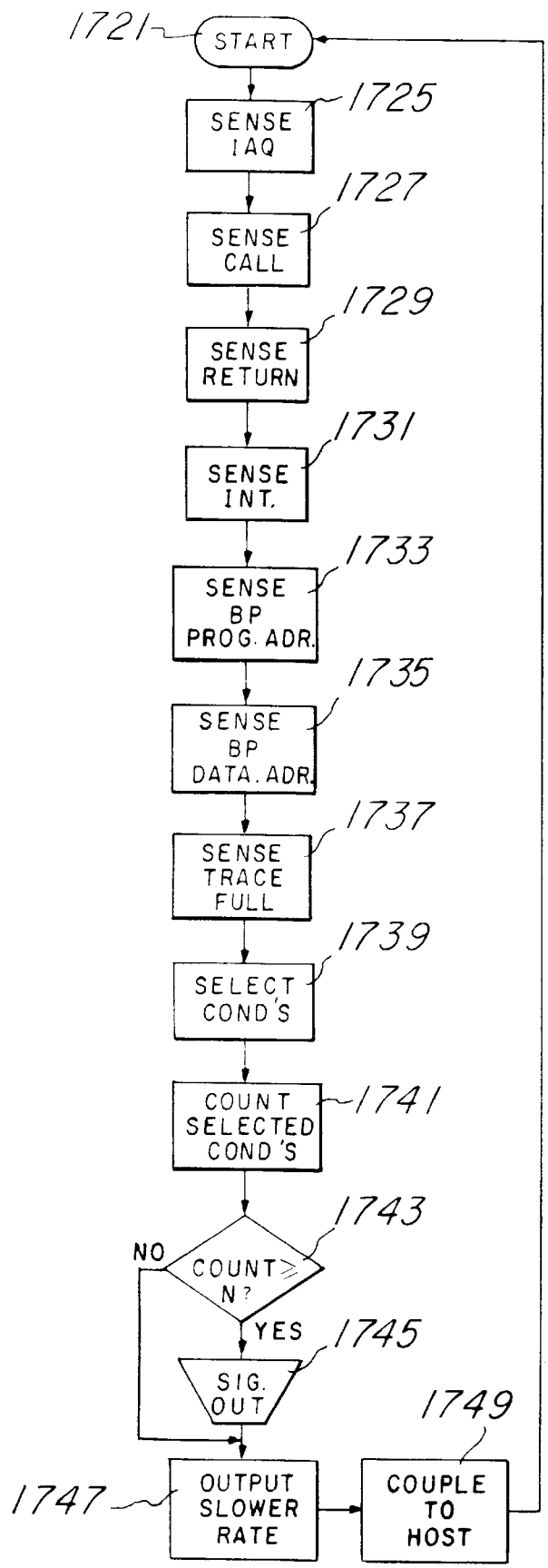
FIG. 12 is a process flow diagram of operations of the analysis circuit of FIG. 11.

In FIG. 12, a method of operating the analysis circuitry of FIG. 11 commences with a START 1721 and proceeds to a step 1725 to 5 sense instruction acquisition. Step 1727 senses a subroutine call, and a step 1729 senses a Return. In step 1731, an interrupt condition is sensed. Step 1733 senses a breakpoint program address, and step 1735 senses a breakpoint data address. In step 1737, a trace stack full condition is sensed. Then a step 1739 selects which conditions are relevant using shift register 1711 and lock 1703 (1703.1–1703.8) of FIG. 11 for example. Of the conditions selected, a count is kept in step 1741. A decision step 1743 determines whether the count exceeds a predetermined count N and if so, a signal of the count N being reached is output in a step 1745. Operations proceed from either step 1743 or 1745 to a step 1747 which provides an output to the external processing equipment at a slower rate than the rate of operation of the device 11. In step 1749, this output is coupled to a host computer whereupon operations return to START 1721 to repeat the steps indefinitely.

Figure 13:
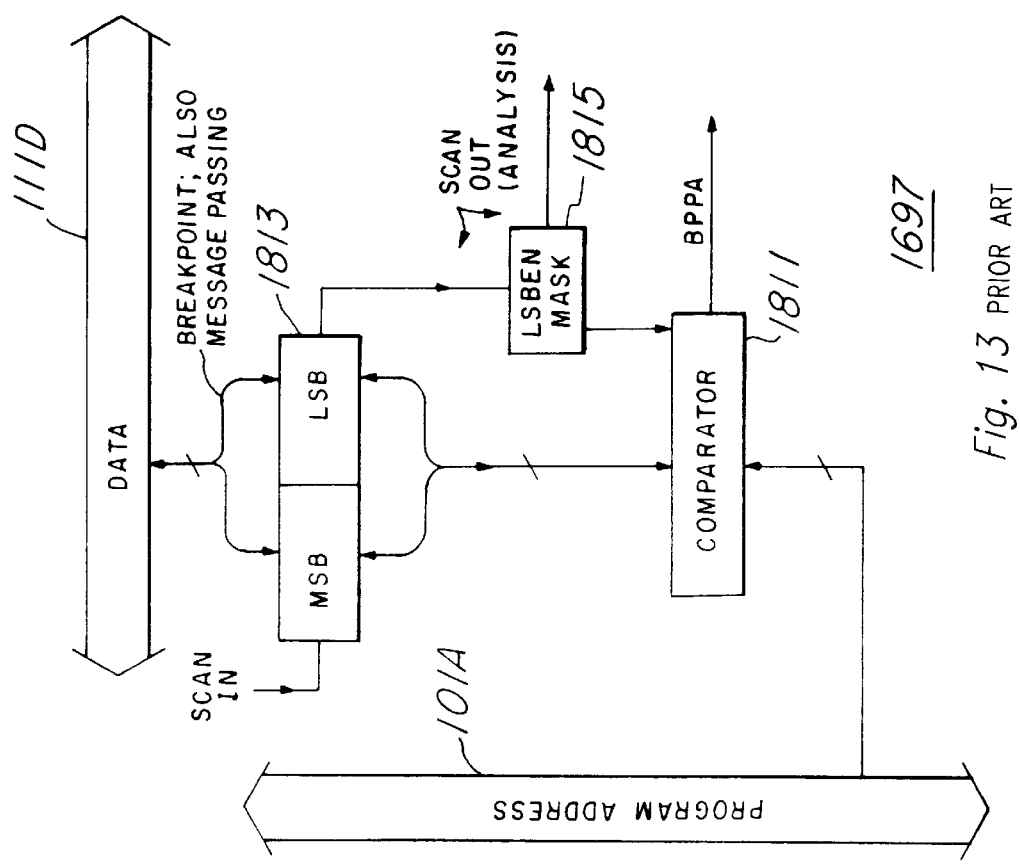
FIG. 13 is a block diagram of a hardware breakpoint circuit.

In FIG. 13, a circuit for breakpoint sensor 1697 supplies the signal BPPA (program address breakpoint) for analysis circuitry of FIG. 11. The circuit is suitably replicated for a breakpoint sensor for producing the signal BPDA (data address breakpoint).

In FIG. 13, program address bus 101A is connected to a digital comparator 1811. A reference value is scan-loaded into a further register 1813 in the analysis domain having most significant bits MSB and least significant bits LSB. Alternatively, register 1813 may be loaded from data bus 111D under control of code which is being executed on digital processor 11. When a program address asserted on address bus 101A is identical to the contents of register 1813, then comparator 1811 produces an output indicative of a breakpoint address occurrence on line BPPA.

In a further advantageous feature of the breakpoint circuit, a breakpoint may be taken on any address within a selected group of addresses such as the range indicated by the most significant bits MSB of register 1813. In such case, a scanable mask register LSBEN is scan-loaded to disable the response of comparator 1811 to the LSB bits of register 1813. Only the most significant bits are compared by comparator 1811 in this mask condition, thereby providing a breakpoint on occurrence of a program address in a particular range of addresses.

Scanable register 1813 for breakpoint purposes requires no connection to data bus 111D. However, this register 1813 is advantageously reused for message passing access between the emulation/simulation/test host computer 1101 of FIG. 2 and the data bus 111D of the target device. The message passing function is used when breakpoint sensing need not occur, and viceversa, so that register 1813 feasibly performs different functions at different times.

Figure 14:
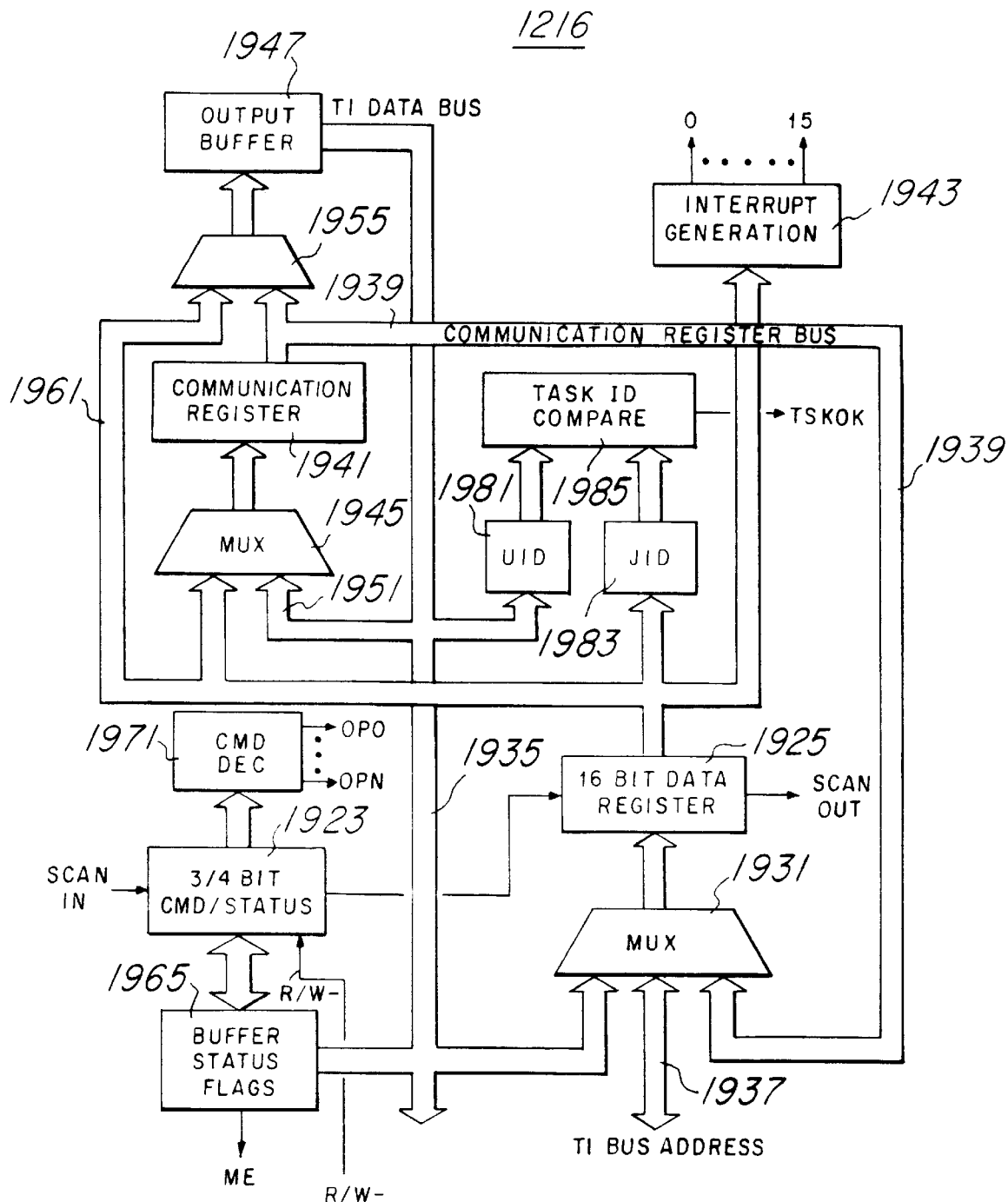
FIG. 14 is a block diagram of the message passing circuitry of FIG. 7.

FIG. 14 shows a block diagram of message passing circuitry 1216 located on chip. The message passing circuit 1216 is interconnected with the analysis domain 1217, core domain and communicates with emulation adapter 1203 and scan control 1149. Interrupt generation circuitry 1943 also interfaces the rest of message passing circuit 1216 to the 16 interrupt lines in the device 11. A serial scan path of FIGS. 9 and 14 has serial data SCAN IN enter a shift register 1923 CMD/STATUS for entry of commands to operate the message passing circuitry 1216 and for scan out of status information. The serial path continues to a further serial register 1925 designated 16 BIT DATA REGISTER whereupon the scan path exits on a line designated SCAN OUT. The function of shift register 1925 can be implemented by register 1813 of FIG. 13 in the analysis domain and reuse principles can generally minimize the chip real estate required for message passing.

The shift register 1925 is connected to the output of a MUX 1931 which selects one of three paths to load into the register 1925. Two of these paths are the data and address portions of the TIBUS peripheral bus of FIG. 7. The data portion is designated 1935 and the address portion is designated 1937 in FIG. 14. The third path called the communications register bus 1939 is connected to a communication register 1941.

The message passing circuitry 1216 is useful for simulated peripheral accesses, for communications I/O (input/output) with test host computer 1101 as an attached processor, and for transferring data structures between test host computer 1101 and device 11.

The structure and operation of message passing circuitry 1216 is further described in connection with an example of a test host interchange. The device 11 suitably parallel-loads the register 1925 via MUX 1931 when a peripheral access or other outbound communication is commenced. Host computer 1101 scan uploads the contents of register 1925. Test host computer 1101 may scan down-load data or a handshake signal into the register 1925. To convey the data to the peripheral bus, register 1925 is selected by a MUX 1945 to be loaded into a communication register 1941. Communication register 1941 then supplies the data through a MUX 1955 and then an output buffer 1947 onto the data bus portion 1935 of the TIBUS peripheral bus.

MUX 1945 can also accomplish reverse data transfers wherein communication outward bound on TI data bus 1935 reach MUX 1945 at a input 1951 and are communicated via communication register 1941 through communication register bus 1939 and MUX 1931 to the 16-bit data register 1925.

MUX 1955 selects either the communication register bus 1939 or an additional bus 1961 directly connected to data register 1925. In this way, data can be even more directly communicated from register 1925 via path 1961, MUX 1955 and output buffer 1947 to the TI data bus.

Buffer status flags are communicated from hardware 1965 of device 11 along with Read/Write signal RIW to CMD/STATUS register 1923 for scan out to host computer 1101. the host computer receives these buffer status flags and returns reply command signals simulating the peripheral, including its "impersonated" reply on line ME.

Some of the command bits from register 1923 are communicated to a command decoder CMD DEC 1971. Decoder 1971 decodes the commands and selectively activates operation output lines OPO. . . OPN to the MUXes and registers of the message passing circuitry 1216 to operate circuitry in accordance with the commands. Thus, processor-level sophistication and flexibility are available in message passing circuitry 1216. In further aspects, MUX 1945 has an input 1951 connected to the data portion of the peripheral bus TIBUS for further flexibility. Register 1925 is connected to interrupt generation block 1943 so that even the interrupt status of device 11 can be scan loaded from host computer 1101.

A register UID 1981 is connected to the data bus 1935. A further register JID 1983 is connected to the data register 1925. The outputs of registers UID and JID are supplied to a task identifications compare circuit 1985. When the identifications match, an output signal TSKOK is output. Thus, when the message passing circuitry has completed its work it can signal its internal condition to any circuit that can advantageously utilize the information. For example, the task OK signal TSKOK can be used to release a SUSPEND hold on the 12-bit down counter 1715 of FIG. 11.

According to the present invention, there is a need to perform emulation and simulation functions without halting CPU 11, thus preserving its ability to service interrupts and perform other functions. This capability is realized by setting trigger events that normally direct the core to halt to instead invoke a trap to a reserved location. The user links a trace monitor program to user software to service the trap. When the trap occurs, the monitor program transfers one or more relevant data items to trace region 99 of FIG. 7 in internal or external memory. The trace monitor may store several data items in the trace region and transfer all of them to the test host when the region is full, or the monitor may transfer trace data to the test host as soon as the data is captured.

The trace monitor communicates with the test host computer 1101 through a TIBUS peripheral such as message passing register 1925 having an address that resides in the TIBUS address space. The trace monitor notifies the test host that data is available for transfer and then the test host transfers the data. This notification signal can be a bit that is written to status register 1923, for example. Alternatively, a notification signal could be a particular data pattern or data bit that is written into data register 1925. Mter writing a data item in register 1925 and sending a notification signal, the trace monitor returns to the application program so that only a minor amount of time is used by the trace monitor. When the test host has received the data item from the test port of processor 11 via serial line 1103, test host 1101 returns a handshake signal via serial line 1103 to indicate that processor 11 can write another data item into message passing register 1925. Message passing circuit 1216 may signal the trace monitor that a handshake signal has been received by setting an interrupt in generator 1943. The interrupt can be as a result of a status bit in register 1923 being set or a command being decoded in command decoder 1971, for example.

Figure 15:
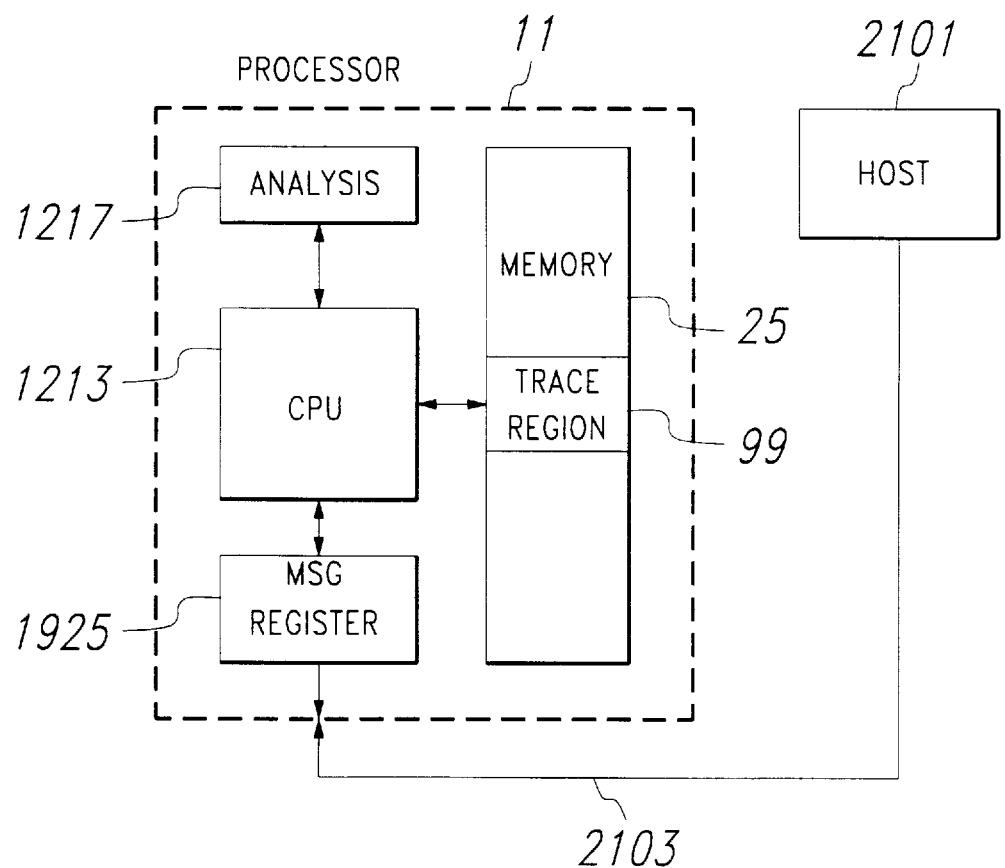
FIG. 15 is a block diagram of another embodiment of a standalone processor with a trace region according to an aspect of the present invention.

FIG. 15 shows another embodiment in which processor 11 may be a standalone processor which is connected to host processor 2101 via interconnect 2103, which may be a serial bus, for example. Message register 1925 interfaces with interconnect 2103 and is controlled by CPU 1213 such that data items stored in trace region 99 may be sent or received from host processor 2101 under control of software executing on CPU 1213. Host processor 2101 performs the testing support functions as described above for host processor 1101. Trace region 99 is dynamically defined by software executing on CPU 1213. Trace region 99 is not physically separate from memory 25, being just a defined region within memory 25.

According to the present invention, there is a need to perform emulation and simulation functions without halting CPU 11, thus preserving its ability to service interrupts and perform other functions. This capability is realized by setting trigger events that invoke a trap to a reserved location. The user links a trace monitor program to user software to service the trap. When the trap occurs, the monitor program transfers one or more relevant data items to trace region 99. The trace monitor may store several data items in the trace region and transfer all of them to test host 2101 when the region is full, or the monitor may transfer trace data to the test host as soon as the data is captured.

Figure 16:
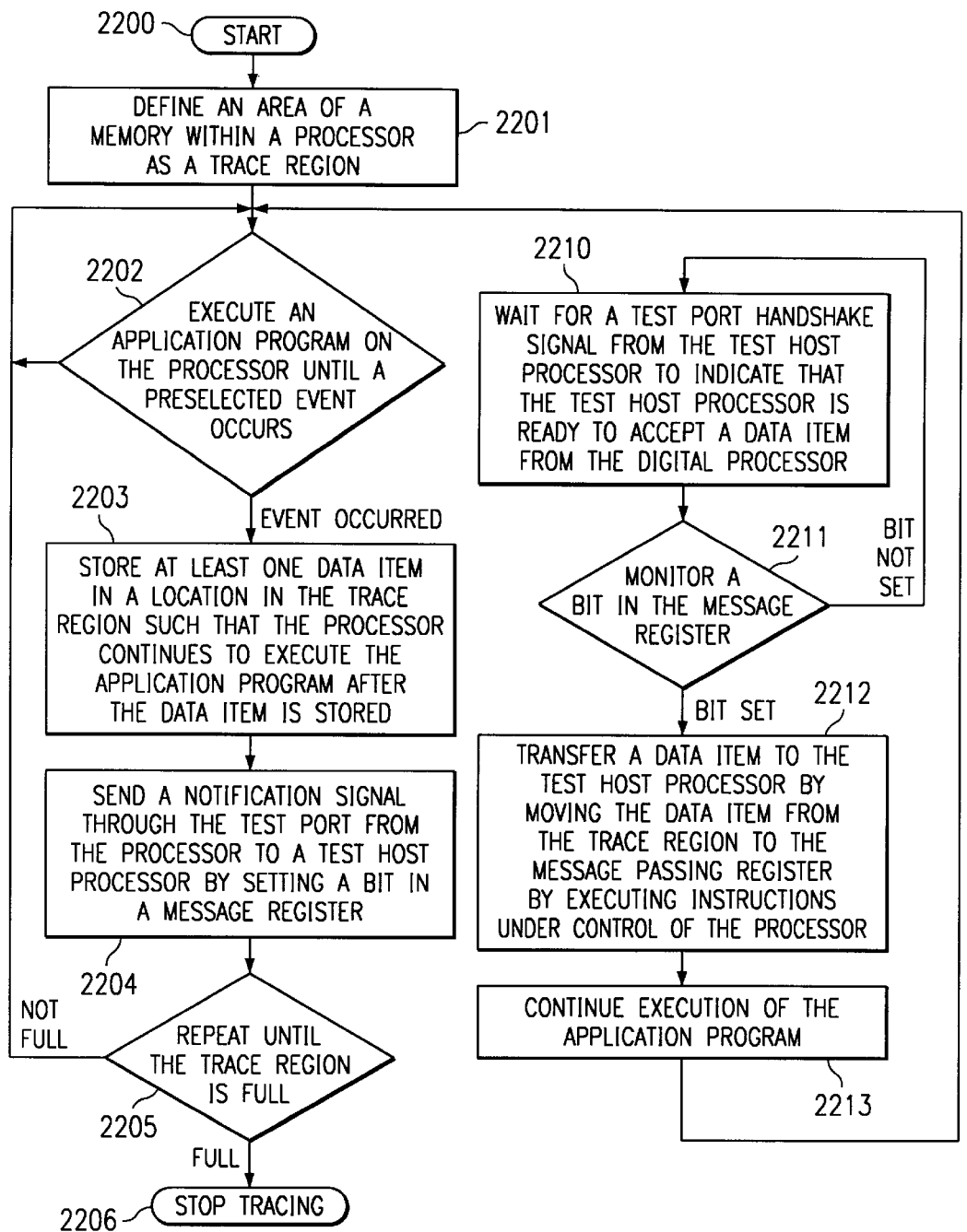
FIG. 16 is a flow diagram showing a method of testing a digital processor, according to aspects of the present invention.

FIG. 16 is a flow diagram showing a method 2200 of testing a digital processor, according to aspects of the present invention. In step 2201, an area of a memory within the digital processor is defined as a trace region. In step 2202, an application program on the digital processor is executed until a preselected event occurs. Various types of events can be preselected, such as those discussed with reference to FIG. 11. After the occurrence of an event, at least one data item relating to the event is stored in a location in the trace region in step 2203. This is done in a manner such that the processor continues to execute the application program after the data item is stored. According to an aspect of the present invention, step 2203 is performed by instructions executed by the data processor. In step 2204, a notification signal is sent through the test port from the digital processor to a test host processor by setting a bit in a message register. Steps 2202–2204 are repeated until the trace region is full, as indicated in step 2205.

According to another aspect of the present invention, the digital processor waits for a test port handshake signal from the test host processor to indicate that the test host processor is ready to accept a data item from the digital processor in step 2210. The digital processor responds to an interrupt in step 2211 in response to a monitored bit in the message register, as discussed with reference to FIG. 14. The digital processor transfers a data item to the test host processor by moving the data item from the trace region to the message passing register by executing instructions in step 2212. After transferring the data item, the digital processor resumes execution of the application program in step 2213 and returns to step 2202.

An advantage of the present invention is that a user can create a monitor program which stores a variety of data items in trace region 99 which may be helpful in debugging a program. Various trigger events may be utilized to cause the monitor program to store the various data items in trace region 99.

Another advantage of the present invention is that the trigger may be initiated by event detection circuitry that is part of processor 11. Thus, processor 11 actively analyzes itself without the need of external monitoring hardware.

Another advantage of the current invention is that when a trigger event occurs, the trace monitor program can perform additional processing, such as checking address bounds, determining which routine wrote a data item by evaluating the program counter, checking other processor status registers, etc.

Another advantage of the present invention is that the operation of the trace monitor program may be varied to produce various end results, such as modifying internal registers, saving error status in trace region 99, stopping CPU 1213, etc.

As used herein, the terms "applied," "connected," and "connection" mean electrically connected, including where additional elements may be in the electrical connection path.

While the invention has been described with reference to illustrative embodiments, this description is not intended to be construed in a limiting sense. Various other embodiments of the invention will be apparent to persons skilled in the art upon reference to this description. It is therefore contemplated that the appended claims will cover any such modifications of the embodiments as fall within the true scope and spirit of the invention.

What is claimed is:

1. A method for testing a digital processor, said digital processor having a memory portion and a test port, comprising the steps of:

defining an area of said memory portion as a trace region;

executing an application program on said digital processor until a preselected event occurs;

storing at least one data item in a location in said trace region in response to said preselected event by said digital processor executing a monitor program included with said application program, such that said digital processor continues to execute said application program after said data item is stored, wherein said monitor program is operable to perform additional processing and may be varied by loading a new application program; and transferring said data item to a test host processor through said test port such that said digital processor continues to execute said application program after said data item is transferred.

2. The method of claim 1 wherein said digital processor further comprises a message passing register and wherein the step of transferring said data item further comprises moving said data item from said trace region to said message passing register by means of instructions executed under control of said digital processor.

3. The method of claim 1 the step of storing at least one data item further comprises:

determining if said trace region is full; and sending a notification message to said test host processor if said trace region is full.

4. The method of claim 3 wherein the step of storing said data item is repeated at least once.

5. The method of claim 1 wherein said data item is a memory address.

6. The method of claim 1 wherein said data item is a program counter address.

7. The method of claim 1 wherein said data item is a register content.

8. The method of claim 1 wherein said preselected event is an application program execution discontinuity.

9. The method of claim 1 wherein said preselected event is an address breakpoint.

10. The method of claim 1 further comprising inserting a means for specifying said preselected event in said application program.

11. A method for testing a digital processor, said digital processor having a memory portion, a test port, and a message passing register, comprising the steps of:

A. defining an area of said memory portion as a trace region;

B. executing an application program on said digital processor until a preselected event occurs;

C. storing at least one data item in a location in said trace region in response to said preselected event by said digital processor executing a monitor program included with said application program, such that said digital processor continues to execute said application program after said data item is stored, wherein said monitor program is operable to perform additional processing and may be varied by loading a new application program;

D. repeating steps B–C until said trace region is full; and

E. transferring at least one said data item to a test host processor through said test port by moving said data item from said trace region to said message passing register by means of instructions executed under control of said digital processor such that said digital processor continues to execute said application program after said data item is transferred.

12. The method of claim 11 wherein step F further comprises:

sending a notification signal through said test port from said digital processor to said test host processor when at least one said data item is in said trace region; and waiting for a handshake signal through said test port from said test host processor to said digital processor to indicate that said test host processor is ready to accept said data item from said digital processor.

13. The method of claim 12, in which:

the step of sending a notification signal further comprises setting a bit in said message register; and the step of waiting for a handshake signal further comprises monitoring a bit in said message register.

14. A method for testing a digital processor, said digital processor having a memory portion, a test port, and a message passing register, comprising the steps of:

A. defining an area of said memory portion as a trace region;

B. executing an application program on said digital processor until a preselected event occurs;

C. storing at least one data item in a location in said trace region in response to said preselected event, such that said digital processor continues to execute said application program after said data item is stored;

D. repeating steps B–C until said trace region is full;

E. sending a notification signal through said test port from said digital processor to said test host processor when at least one said data item is in said trace region by setting a bit in said message register; and F. waiting for a handshake signal through said test port from said test host processor to said digital processor by monitoring a bit in said message register to indicate that said test host processor is ready to accept said data item from said digital processor; and E. transferring at least one said data item to a test host processor through said test port by moving said data item from said trace region to said message passing register by means of instructions executed under control of said digital processor such that said digital processor continues to execute said application program after said data item is transferred.

15. The method of claim 14 wherein said data item is a memory address.

16. The method of claim 14 wherein said data item is a program counter address.

17. The method of claim 14 wherein said data item is a register content.

18. The method of claim 14 wherein said preselected event is an application program execution discontinuity.

19. The method of claim 14 wherein said preselected event is an address breakpoint.

* * * * *